Patented Aug. 5, 1952

2,606,288

UNITED STATES PATENT OFFICE 2,606,288

TIMING PULSE GENERATOR

Earl L. Chatterton, Bloomfield, and Andrew S. Hegeman, Jr., Glen Ridge, N. J., assignors to Western Electric Company, Incorporated, New York, N. Y., a corporation of New York Application October 4, 1950, Serial No. 188,457

8 Claims. (Cl. 250—27)

This invention relates to the generation of timing pulses and particularly to means for increasing the accuracy of the time spacing of these pulses.

In one known method of generating such pulses advantage is taken of the high accuracy of available standard frequencies by counting the cycles of such a signal, generating one timing pulse for each hundredth, thousandth or millionth cycles as the case requires. For example, when using a standard frequency of 1 mc. and generating one pulse for each million cycles of the signal, the timing pulses will be spaced one second apart. This is readily accomplished by means of a plurality of decade counting circuits serially connected together to count the number of cycles of the source in the pulse spacing interval required and produce one pulse at the output of the slowest cycling decade.

In such a system the degree of accuracy obtainable is limited by the variations in the transit time of the signal pulses in passing through the successive decades.

The object of this invention is to eliminate the errors due to these transit time variations.

Applicants accomplish this object by inserting normally closed gating means between the standard frequency source and a pulse output circuit, and providing means for opening the gate only on a specific cycle of the standard frequency.

More specifically, to a system of the type described above there is added a series of trigger circuits, one for each counting decade, these circuits being serially connected in a backward sense relative to the counting decades. A triggering connection is provided from the input of each decade to the corresponding trigger circuit and a similar connection made between the output of the slowest cycling decade and the first trigger circuit to give an output timing pulse at the last trigger circuit which is independent of variation in the transit time of pulses through the decades.

Other objects and advantages will be apparent from the following detailed specification taken in conjunction with the attached drawings in which.

Figure 1:
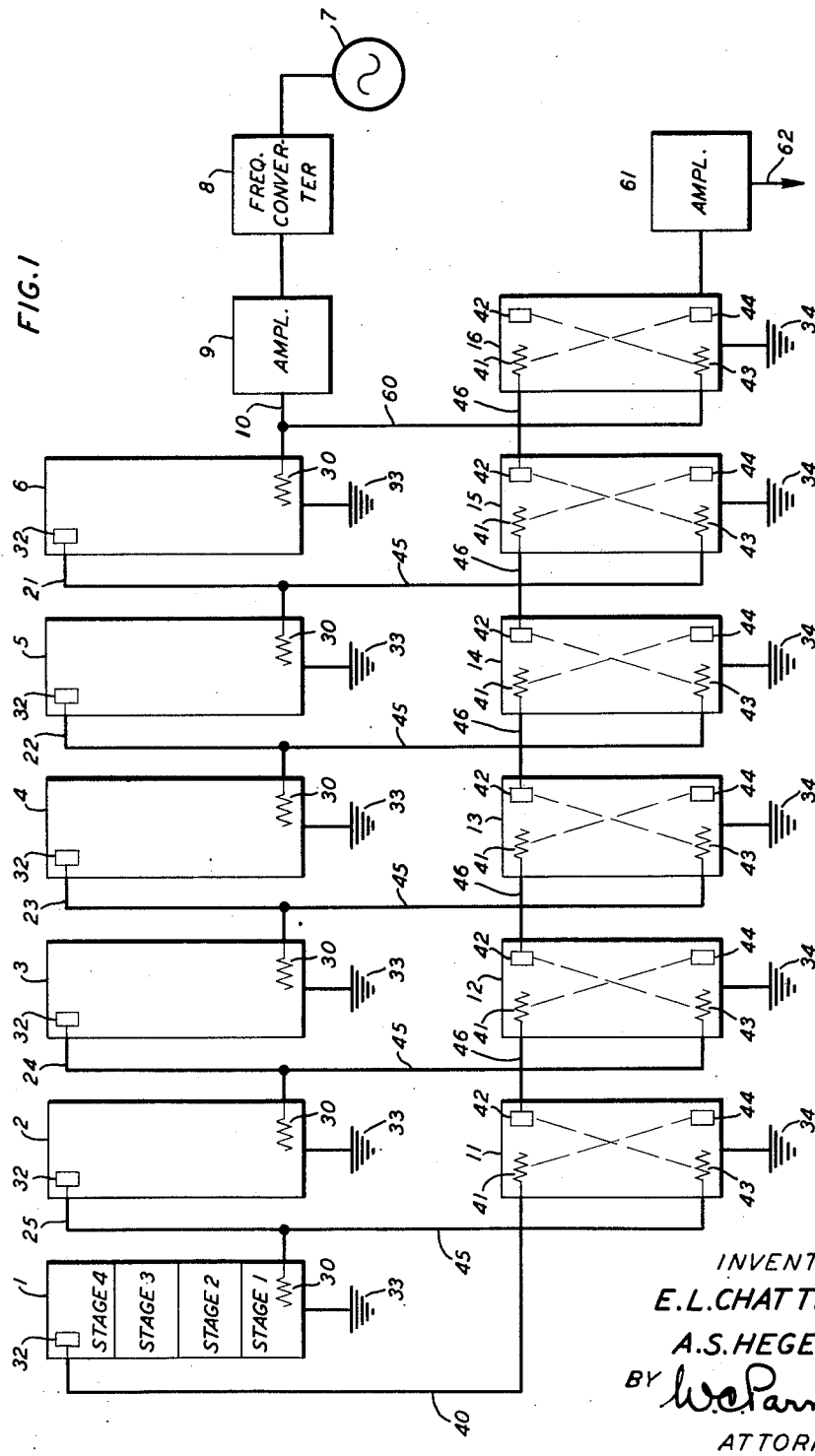
Fig. 1 is a schematic diagram of the invention.

As may be seen in Fig. 1, a standard frequency source 7 is used as the basis for the generation of the timing pulse. This frequency should preferably be high, for example, one megacycle, in order to obtain a timing pulse having the sharp definition required to provide an accurate time interval. If a one megacycle frequency is not available, the standard frequency may be changed to this value by any conventional frequency converting means 8. One way in which this conversion may be accomplished is through the use of a harmonic generator as described in the Bell System Technical Journal, page 437, dated October 1937. The one megacycle frequency thus obtained is then passed through an amplifier 9 before entering the timing pulse apparatus through conductor 10. The incoming standard signal next passes through a plurality of counting decades 1 through 6. These are conventional counter units and may be of the type described in the article entitled "Electronic Counters" by I. E. Grosdoff, RCA Review, September 1946. Each individual decade comprises a conventional four-stage cascaded trigger circuit as indicated in decade 1, in which feedback is added between the second and third stages and between the third and fourth stages to reduce the normal 16 counts to 10 counts per decade output pulse and thereby convert the unit from the binary system to the decimal type. These decades use a conventional count indicating system with neon lamps behind a numbered strip interconnecting the plate circuits to indicate the electrical positions of the decades.

Counting decades 1 through 6 are connected in series through connecting leads 21, 22, 23, 24, and 25 so that each decade after decade 6 receives the output pulse of each previous unit. As a result, with a one megacycle signal input, each decade of the six will pass through zero and cycle only $\frac{1}{10}$ as fast as the preceding decade, and the slowest unit, decade 1, will cycle only once for each million cycles of the standard frequency.

As shown in Fig. 1, the input signal is impressed in each case on grids 30 of the first stage of each decade while the output is taken from the plate circuits 32 of the fourth or last stage of each decade. The individual decades are grounded at points 33 as shown.

It is possible to use the output pulse of decade 1 as a timing pulse, this pulse occurring once each second for the combination of a one megacycle standard frequency and a six decade counter. However, the passage of pulses derived from the standard frequency source through the six counting decades is not under control, and since there are twenty-four trigger circuits in the six units, each having a finite time of operation, it is obvious that variations will occur in the passage time of pulses through the decades. These variations in the total time of operation of the twenty-four circuits will adversely affect the accuracy of any timing pulse taken from the output of decade 1, and as a result, timing pulses obtained in this manner are unsatisfactory for counting operations where extreme accuracy is required.

To overcome this difficulty and to provide an accurate timing pulse which is largely independent of variations in pulse transit time through the decades, applicants have used a plurality of trigger circuits corresponding in number to the counting decades and interconnected with these decades. These trigger circuits are similar to those used in the individual stages of the counting decades except that instead of having a single input to the grids of the circuit, separate inputs are provided to enable the circuit to be actuated by pulses from two separate sources. As shown, the individual circuits are grounded at points 34. The action of these trigger circuits 11 through 16 in conjunction with counting decades 1 through 6 is as follows:

Counting decade 1, being the last of six decades, cycles once each second for an input signal of one megacycle. The output is a rectangular wave which is suitably differentiated to give a positive and a negative pulse. The positive pulse is eliminated through a diode rectifier (not shown) while the negative pulse is fed through conductor 40 to the grid 41 of trigger circuit 11 thus driving the upper half of the circuit including the plate 42 to non-conduction. The grid 41 and plate 42 are cross-connected to the grid 43 and plate 44 of the other half of the circuit in the usual manner and, through conventional trigger circuit action, the lower half of the circuit containing the plate 44 is driven to conduction. The output of counting decade 2, in addition to being fed into counting decade 1, is also fed through lead 45 to the grid 43. Decade 2 produces ten cycling pulses per second, each of which tends to drive the lower half of trigger circuit 11 to non-conduction. However, on nine of these ten pulses, this lower half is already non-conducting so that these incoming pulses have no effect. It is only on the first pulse after the lower half including the grid 43 and plate 44 has been driven to conduction by the output pulse from decade 1 that the pulse from decade 2 is operative to change it from a conducting to a non-conducting state. When this lower half is thus rendered non-conducitng, the upper half is caused to be conducting, and through the inherent inversion action of the circuit, a negative going output pulse will be produced.

It will thus be seen that the upper half of trigger circuit 11, including plate 42, has been made non-conducting by the output pulse from decade 1 and subsequently made conducting by the output pulse from decade 2 next after the cycling of decade 1. This triggering action results in a rectangular wave output signal whose left half is positive going and whose right half is negative going. The wave is then differentiated to give first a sharp positive pulse and then a sharp negative pulse which reaches the trigger circuit 12. The positive pulse will have no effect as it is eliminated by a diode rectifier, but the negative pulse will reach the grid 41 of the circuit 12 to drive the upper half of the circuit to conduction.

The same triggering action just described in connection with circuit 11 also takes place in trigger circuits 12, 13, 14, and 15. In each case the upper half of the circuit is first rendered non-conducting by the output pulse from the previous triggering circuit. These halves are then placed in a conductive state by the cycling pulses from decades 3, 4, 5, and 6 respectively which act on the lower grids 43 of the circuits. These actuating pulses are in each case the first cycling pulses after the cycling of the next slower decade.

The actuation of circuit 16 differs slightly from that of the preceding trigger circuits. In this case, the upper half of the circuit is rendered non-conducting by the output pulse from trigger circuit 15, but instead of receiving the output of one of the counting decades to render it conducting, it receives an actuating pulse direct from the standard frequency source 9 through conductor 60. This pulse which drives the lower half of trigger circuit 16 to non-conduction is the pulse of the standard frequency source next in time after this half has been rendered conducting by the triggering action of the output pulse from circuit 15 on the upper grid 41 of circuit 16.

In the case of trigger circuit 16 the rectangular wave output resulting from the triggering action is taken from the lower plate 44 instead of from the upper plate 42 as in the previous trigger circuits.

The lower half of trigger circuit 16 therefore acts as a gate which is normally closed by the interaction of the decades and trigger circuits and is allowed by such interaction to be opened only on a specific cycle of the standard frequency.

The rectangular wave resulting from trigger circuit 16 is differentiated by a suitable circuit (not shown) and thereby shaped to provide a succession of sharply peaked positive and negative pulses. These pulses are then fed into means for selecting pulses of a desired polarity, such as an amplifier 61 which is biased to cut off, causing the positive pulses to be amplified as desired whereas the negative pulses will not appear in the amplifier output in view of the cutoff bias. As a result of the inherent inversion action of the amplifier, the output 62 will be a series of peaked negative timing pulses which occur at the rate of one per second for the combination of a 1 megacycle standard signal and a six decade counter.

The amplifier 61 may have more than out output for the timing pulse thus obtained. The use of multiple outputs enables the pulse generating apparatus to act as a pulsing service unit simultaneously for a plurality of applications. Cathode follower type outputs are especially suitable in such a case since they effectively isolate the various pulse output circuits from each other and also provide a low impedance source for the transmission of the pulses.

The result of the present apparatus is a sharp timing pulse which occurs once per desired unit of time, this time being one second in the example here presented. The backward cascade arrangement of the triggering circuits with respect to the counting decades insures that the timing pulse is produced by a single specific cycle of the standard frequency signal, this specific cycle being the first one in time after the upper half of trigger circuit 16 has been driven to cutoff by the input pulse from circuit 15.

Figure 2:
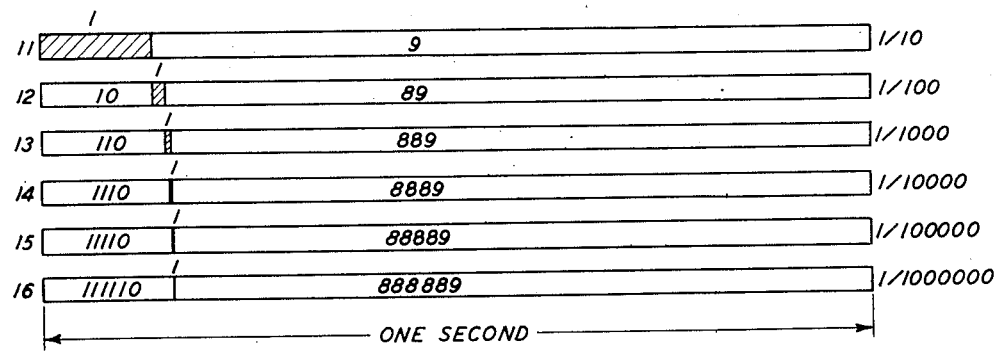
Fig. 2 is a chart of the time sequence of operation of the trigger circuits used in the invention.

The manner in which the effect of variations in transit time of pulses through the counting decades is largely eliminated may be seen by reference to Fig. 2. This figure is a chart in which the shaded portions represent the relative time during a one second cycle that the upper halves of the six trigger circuits are in a non-conducting state. The unshaded portions of the chart represent the time that the upper halves of the trigger circuits are in a conducting state. The numbers pertaining to the individual blocks represent the fractional parts of a complete second that the upper halves of the trigger circuit are in the two conditions shown, while the numbers at the right of the blocks represent the fractional part of a complete second that these upper halves are in a non-conducting state. The chart is predicated on the use of a one megacycle standard frequency in conjunction with a 6 decade counter to give a pulse interval time of one second.

With reference to the previous description, it has been shown that the input pulses to the six counting decades, which represent the output pulse from the previous next faster decade in all cases except for decade 6, drive the lower halves of the trigger circuits to non-conduction and thereby cause a negative output pulse to be applied immediately to the succeeding trigger circuit. The time interval between this pulse being impressed on the bottom half of one circuit and the arrival of the circuit output pulse to drive the upper half of the succeeding circuit to non-conduction is normally only about $\frac{1}{10}$ microsecond. This action is therefore practically instantaneous and is so shown in the chart in Fig. 2.

With reference to Figs. 1 and 2, it will be seen that the upper half of trigger circuit 11 is turned off by a cycling pulse from counting decade 1 and is turned on by the next pulse in time arriving from decade 2. Even though there is a small variation in the time of its being turned off, this will be of no importance as long as it is turned off by the time the pulse from decade 2, next after the cycling pulse from decade 1, reaches this circuit to drive the upper half to non-conduction. The same consideration prevails throughout the trigger circuits and since even with normal variations the action of the conventional trigger circuit used is fast enough that each is always turned off well in advance of the arrival of the turn on pulses, the variations in time of the operation of the counting decades and trigger circuits may be disregarded. In other words, every time the upper half of a particular trigger circuit has been turned on by the proper pulse, any variations in time in the trigger or decade circuits preceding it may be disregarded.

The only circuits with whose operational time variations we are concerned are the circuits in the four stages of decade 6, plus trigger circuit 15 in connection with the driving of its lower half to non-conduction and trigger circuit 16 in connection with the driving of its lower half to conduction. To insure accuracy of the timing interval, these six circuits must operate within a period of one microsecond which is the time between the pulse which cycles decade 6 and the next pulse which turns on the lower half of circuit 16. In practice the operating time of these circuits with normal care in design is well under a microsecond with the result that the lower half of trigger circuit 16 is always made conducting by the arrival of the first pulse in time from the standard frequency source after the pulse which cycled decade 6.

As long as the primary condition of operation is met, i. e., that the upper half of each trigger circuit shall have been rendered non-conductive by the cycling pulse of a particular decade by the time its turn on pulse arrives, the various triggering actions will always take place on exactly the same pulses of the timing pulse generation sequence. The result will be that the output pulse from trigger circuit 16 will always be produced by a specific cycle of the standard frequency. This means that the timing pulses which are the output of the system always have exactly the same interval of time between them and may therefore be termed accurately periodic.

It should be borne in mind that the turn on pulses referred to are taken from the input of the various decades. In the case of decades 1 through 5, this pulse is the first cycling pulse after the cycling of the next slower decade. In the case of decade 6, this pulse is the first pulse of the standard frequency after the pulse which cycles decade 6.

In connection with the above, the number of the incoming pulses, after the cycling of decade 1, which drive the upper halves of the various trigger circuits to conduction are as follows:

| | |
|---|---:|
| 11 | 100,000 |
| 12 | 10,000 |
| 13 | 1,000 |
| 14 | 100 |
| 15 | 10 |
| 16 | 1 |
| | 111,111 |

From the above it is apparent that it is pulse 111,110 of the incoming signal which drives the upper half of trigger circuit 16 to non-conduction. This circuit is then driven to conduction by the next incoming pulse from the standard frequency source which is 111,111. The present circuit has been designed so that it has to be pulse 111,110 which drives the upper half of trigger circuit 16 to non-conduction as long as the upper half of every preceding trigger circuit has been turned off before the arrival of the turning on pulse, from its actuating decade, next after the cycling of the next slower decade. The upper half of trigger circuit 16 is also always turned on by pulse 111,111 of the input standard signal provided that pulse 111,110 has passed through the six circuits in decade 6 and trigger circuits 15 and 16 to turn off the upper half of circuit 16 within one microsecond, which is the time required for the arrival of the next succeeding pulse.

The sequence of events of the various cycles of the incoming standard signal is as follows:

Pulse 1—starts the counting sequence

Pulse 1,000,000—cycles all decades to zero including decade #1

Pulse 110,110—turns off upper half of trigger circuit 16

Pulse 111,111—turns on upper half of trigger circuit 16

Pulse 1,000,000—recycles all decades again

It might appear that variations in the time of operation of the four circuits included in decade 6 and in trigger circuits 15 and 16 would result in variations in the width of the rectangular wave output obtained from trigger circuit 16 inasmuch as the location of the left side of the wave would be dependent on this time, whereas the right side results from the action of cycle 111,111 of the standard signal which may be considered as non-varying. However, by causing the left half of the rectangular wave output to be negative going and the right half of the wave to be positive going, and then eliminating the negative pulses resulting from differentiation of the rectangular wave by passing through the amplifier 9 biased at cutoff, the effect of these variations is eliminated. This is accomplished by taking the output of trigger circuit 16 from its lower plate 44 instead of from the upper plate 42 as in the previous circuits to make the left half of the rectangular wave result in a negative going pulse.

When the pulse generator is used for the first time, one or output pulses from decade 16 may occur at irregular intervals, depending on the original state of conduction of the various trigger circuits. In any event a pulse will occur at 111,111 cycles after decade 1 has cycled, and remaining output pulses from circuit 16 will occur at exact intervals.

Pulses from the input to the counting decades do not disrupt the timing interval after the first regularly occurring pulse by premature actuation of the trigger circuits through leads 45 since the lower halves of these circuits which they reach are in a non-conducting state, except for the regular chain sequence, and hence are normally unaffected by the negative actuating pulses.

Timing pulses generated as herein described are independent of variations in the transit time of pulses through the counting apparatus. The backward cascading of the trigger circuits with respect to the counting decades produces a timing pulse having an accuracy essentially equal to that of the standard frequency, the latter usually being stable to one part in $10^8$.

By varying the number of decades used for a given input frequency, it would be possible to provide accurate timing pulses having a frequency of 1, 10, 100, or 1000 per second. It is likewise possible to provide timing pulses occurring once each 10 seconds, one each 100 seconds, etc. This result may be accomplished by adding or subtracting decades and corresponding trigger circuits from the left side of the pulse generating system looking at Fig. 1.

The periodic timing pulses thus generated may be used in any application requiring an accurately timed interval or pulse, or in any applications where a train of such timing pulses may be desirable. One typical application of a timing pulse produced in this manner would be in the direct counting of the frequency of an oscillatory system to provide an accurate timing interval during which the count of the unknown frequency takes place. Such a frequency counting system is described in co-pending application, Serial No. 188,456, filed October 4, 1950.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In a pulse generating system the combination with a source of standard frequency and a plurality of serially connected decade circuits for counting the cycles of the frequency and producing at the output of each circuit one pulse for each counting cycle of the decade, of a pulse output circuit, normally closed gating means between the slowest cycling decade and the output circuit, and means independent of the counting means for opening the gate cyclically on a specific selected cycle of the standard frequency.

2. In a pulse generating system the combination with a source of standard frequency and a plurality of serially connected decade circuits for counting the cycles of the frequency and producing at the output of each circuit one pulse for each counting cycle of the decade, of a pulse output circuit, a normally closed gate circuit between the standard frequency source and the output circuit, means operated by an output pulse from each of the decade circuits for conditioning the gate circuit cyclically to open on a selected cycle, and means independent of the counting means for opening the gate.

3. In a pulse generating system the combination with a source of standard frequency and a plurality of serially connected decade circuits for counting the cycles of the frequency and producing at the output of each circuit one pulse for each counting cycle of the decade, of a trigger circuit for each decade circuit, a triggering connection from the input of each decade circuit to the corresponding trigger circuit, and a like connection between the output of the slowest cycling decade and its trigger circuit, said triggering circuits being serially connected together in backwardly acting relation with respect to the decade circuits.

4. In apparatus for generating a periodic timing pulse, the combination with a source of standard frequency and a plurality of serially connected decades for counting the cycles of the frequency, of a corresponding number of trigger circuits serially connected together in backwardly acting relation with respect to the decade circuits, with the first circuit receiving a first impulse from the slowest decade and a second oppositely acting pulse from the next faster decade, the intermediate circuits receiving corresponding first pulses from the preceding circuit and corresponding second pulses from succeeding faster decades, and the last circuit receiving its first pulse from the preceding circuit and its second pulse from the standard frequency source.

5. In a pulse generating system the combination with a source of standard frequency, means for converting said frequency to a desired value, and a plurality of serially connected decade circuits for counting the cycles of the frequency and producing at the output of each circuit one pulse for each counting cycle of the decade, of a trigger circuit for each decade circuit, a triggering connection from the input of each decade circuit to the corresponding trigger circuit, and a like connection between the output of the slowest cycling decade and its trigger circuit, said triggering circuits being serially connected together in backwardly acting relation with respect to the decade circuits, and a pulse output circuit connected to the output of the last trigger circuit.

6. In apparatus for generating a periodic timing pulse, the combination with a source of standard frequency and a plurality of serially connected decades for counting the cycles of the frequency, of a corresponding number of trigger circuits serially connected together in backwardly acting relation with respect to the decade circuits, with the first circuit receiving a first pulse from the slowest decade and a second oppositely acting pulse from the next faster decade, the intermediate circuits receiving corresponding first pulses from the preceding circuit and corresponding second pulses from succeeding faster decades, and the last circuit receiving its first pulse from the preceding circuit and its second pulse from the standard frequency source, said second pulses being the next in time after the cycling of the decades fed by the second pulses, the trigger circuits being adapted to trigger on said first pulses before the arrival of the second pulses.

7. In apparatus for generating a periodic timing pulse, the combination with a source of standard frequency and a plurality of serially connected decades for counting the cycles of the frequency and producing at the output of each decade one pulse for each counting cycle of the decade, of a corresponding number of trigger circuits serially connected together in backwardly acting relation with respect to the decade circuits and each having two halves each including a grid and plate, with the first circuit receiving an initial pulse from the slowest decade on a first grid and a subsequent pulse from the next faster decade on its second grid, the intermediate circuits receiving corresponding initial pulses from the first plates of the preceding circuit on their first grids and corresponding subsequent pulses from succeeding faster decades on their second grids, and the last circuit receiving an initial pulse from the first plate of the preceding circuit on its first grid and a subsequent pulse from the standard frequency source on its second grid.

8. In apparatus for generating a periodic timing pulse, the combination with a source of standard frequency, means for converting said frequency to a desired value, and a plurality of serially connected decades for counting the cycles of the frequency and producing at the output of each decade one pulse for each counting cycle of the decade, of a corresponding number of trigger circuits serially connected together in backwardly acting relation with respect to the decade circuits and each having two halves each including a grid and plate, with the first circuit receiving an initial pulse from the slowest decade on a first grid and a subsequent pulse from the next faster decade on its second grid, the intermediate circuits receiving corresponding initial pulses from the first plates of the preceding circuit on their first grids and corresponding subsequent pulses from succeeding faster decades on their second grids, the last circuit receiving an initial pulse from the first plate of the preceding circuit on its first grid and a subsequent pulse from the standard frequency source on its second grid, the output pulses of the last circuit being taken from the second plate; and an output circuit for the pulses including means for selecting pulses of a desired polarity.

EARL L. CHATTERTON.
ANDREW S. HEGEMAN, Jr.

REFERENCES CITED

The following references are of record in the file of this patent:

UNITED STATES PATENTS

| Number | Name | Date |
| --- | --- | --- |
| 2,166,688 | Kell | July 18, 1939 |
| 2,519,184 | Grosdoff | Aug. 15, 1950 |